United States Patent
Amri et al.

(10) Patent No.: US 11,868,742 B2
(45) Date of Patent: Jan. 9, 2024

(54) QUANTA IMAGE SENSOR QUANTUM RANDOM NUMBER GENERATION

(71) Applicants: ID QUANTIQUE SA, Carouge (CH); TRUSTEES OF DARTMOUTH COLLEGE, Hanover, NH (US)

(72) Inventors: Emna Amri, Geneva (CH); Yacine Felk, Crans-Près-Céligny (CH); Damien Stucki, Geneva (CH); Jiaju Ma, Pasadena, CA (US); Eric R. Fossum, Wolfeboro, NH (US)

(73) Assignees: ID QUANTIQUE SA, Carouge (CH); TRUSTEES OF DARTMOUTH COLLEGE, Hanover, NH (US)

( * ) Notice: Subject to any disclaimer, the term of this patent is extended or adjusted under 35 U.S.C. 154(b) by 0 days.

(21) Appl. No.: 18/166,925

(22) Filed: Feb. 9, 2023

(65) Prior Publication Data

US 2023/0185535 A1    Jun. 15, 2023

Related U.S. Application Data

(63) Continuation of application No. 17/471,140, filed on Sep. 9, 2021, now abandoned, which is a continuation of application No. 16/099,152, filed as application No. PCT/US2017/031456 on May 5, 2017, now abandoned.

(60) Provisional application No. 62/332,077, filed on May 5, 2016.

(51) Int. Cl.
*G06F 7/58* (2006.01)
*G06N 10/00* (2022.01)

(52) U.S. Cl.
CPC ............. *G06F 7/58* (2013.01); *G06F 7/588* (2013.01); *G06N 10/00* (2019.01)

(58) Field of Classification Search
CPC .......... G06F 7/58; G06F 7/588; G06N 10/00; G06N 99/00
USPC ........................................................ 708/255
See application file for complete search history.

(56) References Cited

U.S. PATENT DOCUMENTS

| | | |
|---|---|---|
| 2009/0272882 A1 | 11/2009 | Rabner |
| 2015/0261502 A1 | 9/2015 | Sartor |
| 2017/0060534 A1 | 3/2017 | Sanguinetti |
| 2017/0249125 A1 | 8/2017 | Pavesi |
| 2019/0384576 A1 | 12/2019 | Scarlett |

FOREIGN PATENT DOCUMENTS

| EP | 2 940 923 A1 | 11/2015 |
|---|---|---|

OTHER PUBLICATIONS

Ma, et al., Jot Devices and the Quanta Image Sensor, Proc of the IEEE International Electron Devices Meeting (IEDM) 2014 (Year: 2014).

E. Amri et al., Quantum Random Number Generation Using a Quanta Image Sensor, Sensors 2016 (Year: 2016).

(Continued)

*Primary Examiner* — Emily E Larocque

(74) *Attorney, Agent, or Firm* — Oblon, McClelland, Maier & Neustadt, L.L.P.

(57) ABSTRACT

Some embodiments provide methods and apparatus for quantum random number generation based on a single bit or multi bit Quanta Image Sensor (QIS) providing single-photon counting over a time interval for each of an array of pixels of the QIS, wherein random number data is generated based on the number of photons counted over the time interval for each of the pixels.

19 Claims, 2 Drawing Sheets

(56) References Cited

OTHER PUBLICATIONS

Burri, et al., SPADs for Quantum Random Number Generators and beyond, pp. 788-794, IEEE 2014 (Year: 2014).
A. Khanmohammadi et al, A Monolithic Silicon Quantum Random Number Generator Based on Measurement of Photon Detection Time, IEEE Photonics Journal, vol. 7, No 5, 2015 (Year: 2015).
Chinese Office Action dated Jun. 10, 2023 in Chinese Application 201780042100.2, (with English translation), 18 pages.
Combined Chinese Office Action and Search Report dated Dec. 5, 2022 in Chinese Patent Application No. 201780042100.2, 9 pages.

QUANTA IMAGE SENSOR QUANTUM RANDOM NUMBER GENERATION

RELATED APPLICATIONS

This application is a continuation of application Ser. No. 17/471,140, filed Sep. 9, 2021, which is a continuation of application Ser. No. 16/099,152, filed Nov. 5, 2018, which is a national stage application under 35 U.S.C. § 371 of International Application No. PCT/US2017/031456, filed May 5, 2017, which claims the benefit of U.S. Provisional Application No. 62/332,077, filed May 5, 2016, each of which is hereby incorporated herein by reference in its entirety.

BACKGROUND

The present disclosure generally relates to random number generation (RNGn), random number generation using photo-detectors, and more particularly to highly-random, non-deterministic, photon-emission-based random number generation.

Generating high quality random numbers is becoming more and more important for several applications such as Cryptography, scientific calculations (Monte-Carlo numerical simulations), and gambling. With the expansion of computers' fields of use and the rapid development of electronic communication networks, the number of such applications has been growing quickly. Cryptography, for example, is one of the most demanding applications. It involves algorithms and protocols for ensuring the confidentiality, the authenticity, and the integrity of communications, which requires true random numbers for generating encryption. High-quality random numbers, however, cannot be obtained with deterministic algorithms (e.g., a pseudo-random number generator (PRNG)); instead, an actual physical process may be relied on to generate high-quality random numbers. The most reliable processes are quantum physical processes which are fundamentally random. In fact, the intrinsic randomness of subatomic particles' behavior at the quantum level is one of the few completely random processes in nature. By tying the outcome of a random number generator (RNG) to the random behavior of a quantum particle, it is possible to guarantee a truly unbiased and unpredictable system, which may be referred to as a Quantum Random Number Generator (QRNG).

The emission of photons is a Poisson process and has been used as the source of randomness in RNGn. Photon detectors used in previous photon-emission-based RNGn technologies include single-photon avalanche diodes (SPADs) and conventional CMOS image sensors (CISs). SPADs can provide single-photon detection capability and realize QRNGn based on photon quantum effects, but the relatively large size (e.g., 7-20 μm pixel pitch in a SPAD array) limits the data output rate per unit area size. Also, the high dark count rate (e.g., ~1000 counts/sec) in SPADs degrades the randomness quality. A conventional CIS is limited by a relatively high noise floor (e.g., >1 e– r.m.s.) in the readout electronics and does not have single-photon detection capability. In this case, the photon signal is significantly corrupted by read noise, and as read noise is also randomly distributed, the RNGn process using a conventional CIS is not fully quantum-effects based, thus limiting the randomness quality and stability of the output.

As such, there is a need for further developments and improvements in QRNGs to, for example, provide QRNGs that more fully exploit and/or realize quantum-based randomness. And such developments and improvements may provide for increasing photon-counting accuracy, reducing noise, reducing dark current, increasing the output data rate, and/or increasing scalability.

SUMMARY OF SOME EMBODIMENTS

To, for example, address at least one or more of the above-described and/or other limitations of QRNGs, some embodiments of the present disclosure provide methods and apparatus for quantum random number generation based on a single-bit or multi-bit Quanta Image Sensor (QIS) providing single-photon counting over a time interval for each of an array of pixels of the QIS, wherein random number data is generated based on the number of photons counted over the time interval for each of the pixels.

In some embodiments, a QRNG comprises (i) a QIS that includes an array of pixels, wherein each pixel is configured to convert a single photon incident on the pixel into a single photocharge-carrier (an electron or a hole) that is stored in the pixel, and wherein the QIS is configured to readout from each pixel, with single-photocharge-carrier sensitivity (thereby providing for single-photon sensitivity), the photocharge-carriers, if any, stored in the pixel within a time interval, so as to generate a pixel signal (e.g., an analog voltage signal or a digital number/signal) corresponding to the number of stored photocharge-carriers; and (ii) comparison circuitry configured to compare (e.g., in the analog or digital domain), for each pixel, the pixel signal with a threshold level to generate for each pixel a bit having a binary value that depends on whether or not the pixel signal is less than the threshold level or not less than the threshold level, wherein the binary values are substantially equiprobable based on the threshold level, thereby providing for binary output data having high quality randomness (e.g., with bit entropy ~1).

All or part of the comparison circuitry may be monolithically integrated with the pixel array of the QIS; in some embodiments, the QIS readout circuitry may embrace or comprise the comparison circuitry.

In some embodiments, the QRNG may also comprise one or more of (i) a photon source configured to generate the photons incident on the QIS pixel array, (ii) an optical conditioner disposed such that photons emitted by the photon source impinge on the optical conditioner prior to impinging on the pixel array, and (iii) a randomness extractor configured to process data (e.g., the random output data, or digital pixel signals) generated from readout of the QIS.

In various embodiments, the QRNG may include control circuitry configured to, for example, adjust or control one or more of, the threshold level, the time interval over which the pixel accumulates photocharge-carriers, the photon source emission intensity, and/or the optical conditioner, to maximize the randomness (e.g., according to the bit entropy metric) of the random number data generated by the QIS. In some embodiments, such adjustment control may be based on, for example, monitoring the quanta exposure and/or measuring/monitoring the randomness of the generated random number data.

In accordance with some embodiments, the single-bit or multi-bit QIS comprises an array of pixels (e.g., jots), each pixel being configured for photoconversion of an incident photon into a corresponding photocharge (e.g., electron (e–) or hole (h+)), and having sufficient in-pixel conversion gain, without in-pixel avalanche gain, to provide for readout of the photocharge with single-electron sensitivity and resolution, thereby providing for single-photon counting over the time interval. In-pixel conversion gain, according to various embodiments, may be at least 420 μV/charge-carrier (e− or h+), and may be more than 500 μV/charge-carrier (e− or h+), and may further be more than 1000 μV/charge-carrier (e− or h+). And, in accordance with various embodiments, the read noise associated with each QIS pixel is about 0.5 charge carriers (e− or h+) rms or less, and may be about 0.3 e− or h+ rms or less, and may further be about 0.15 e− or h+ rms or less. Each QIS pixel may include a charge storage (accumulation) region configured to store (accumulate) the photocharge that is generated in the pixel over the time interval and that is readout from the pixel following the time interval. The full well charge storage capacity of the pixel storage region may be vary depending on the implementation (e.g., single-bit or multi-bit QIS, conversion gain, voltage limits on readout chain, target threshold level, etc.).

Throughout the description and claims, the following terms take at least the meanings explicitly associated herein, unless the context dictates otherwise. The meanings identified below do not necessarily limit the terms, but merely provide illustrative examples for the terms. The phrase "an embodiment" as used herein does not necessarily refer to the same embodiment, though it may. In addition, the meaning of "a," "an," and "the" include plural references; thus, for example, "an embodiment" is not limited to a single embodiment but refers to one or more embodiments. Similarly, the phrase "one embodiment" does not necessarily refer the same embodiment and is not limited to a single embodiment. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise.

In addition, as used herein, unless the context clearly dictates otherwise, the term "coupled" refers to directly connected or to indirectly connected through one or more intermediate components and, in some contexts, may also denote or include electrically coupled, such as conductively coupled, capacitively coupled, and/or inductively coupled. Further, "conductively coupled" refers to being coupled via one or more intermediate components that permit energy transfer via conduction current, which is capable of including direct current as well as alternating current, while "capacitively coupled" refers to being electrostatically coupled through one or more dielectric media, and possibly also via one or more intervening conductors (e.g., via a series of capacitive components), that permit energy transfer via displacement current and not via direct current. Those skilled in the art will further understand that elements may be capacitively coupled intentionally or unintentionally (e.g., parasitically) and that in some contexts, elements said to be capacitively coupled may refer to intentional capacitive coupling. In addition, those skilled in the art will also understand that in some contexts the term "coupled" may refer to operative coupling, through direct and/or indirect connection. For instance, a conductor (e.g., control line) said to be coupled to the gate of a transistor may refer to the conductor being operable to control the gate potential so as to control the operation of the transistor (e.g., switching the transistor between "on" and "off" states), regardless of whether the conductor is connected to the gate indirectly (e.g., via another transistor, etc.) and/or directly.

In this regard, for ease of reference, as used herein, two layers, regions, or other structures/elements may be referred to as being "adjacent" if they do not include one or more intervening layers, regions (e.g., doped regions), or other structures/elements. In other words, two layers, regions, or other structures/elements referred to spatially (e.g., "on," "above," "overlying," "below," "underlying," etc.) with respect to each other may have one or more intervening layers, regions, or other structures/elements; however, use of the term "adjacent" (or, similarly, "directly," such as "directly on," "directly overlying," and the like) denotes that no intervening layers, regions, or other structures/elements are present.

It will be appreciated by those skilled in the art that the foregoing brief description and the following description with respect to the drawings are illustrative and explanatory of some embodiments of the present invention, and are neither representative nor inclusive of all subject matter and embodiments within the scope of the present invention, nor intended to be restrictive or characterizing of the present invention or limiting of the advantages which can be achieved by embodiments of the present invention, nor intended to require that the present invention necessarily provide one or more of the advantages described herein with respect to some embodiments. Thus, the accompanying drawings, referred to herein and constituting a part hereof, illustrate some embodiments of the invention, and, together with the detailed description, serve to explain principles of some embodiments of the invention.

BRIEF DESCRIPTION OF THE DRAWINGS

Aspects, features, and advantages of some embodiments of the invention, both as to structure and operation, will be understood and will become more readily apparent in view of the following description of non-limiting and non-exclusive embodiments in conjunction with the accompanying drawings, in which like reference numerals designate the same or similar parts throughout the various figures, and wherein.

DETAILED DESCRIPTION OF SOME EMBODIMENTS

In accordance with some embodiments according to the present disclosure, random numbers are generated based on a Quanta Image Sensor (QIS) providing single-photon detection of photons emitted from a photon source having Poisson photon-emission statistics, wherein for each QIS pixel (e.g., jot) the number of photons detected by the QIS pixel within a time interval is the quantum random variable used for quantum random number generation (QRNGn). As will be understood by those skilled in the art in view of the present disclosure, such QIS QRNGn embodiments overcome (among other things) limitations of known SPAD-based and conventional CIS-based random number generators (RNGs) (e.g., such as limitations discussed above), and provide for quality quantum random number generation.

And, more particularly, as will be understood in view of the ensuing description, in some embodiments of a QIS quantum random number generator (QRNG) according to the present disclosure, each pixel (e.g., jot) of the QIS QRNG provides for generating a random number based on a comparison between a threshold (e.g., threshold Ut in hereinbelow illustrative embodiments) and a signal that is generated by reading out the pixel and that corresponds to a number of individual photons detected by the pixel within a given time interval.

For a given average number of photoelectrons collected in each jot per given time interval (e.g., frame), referred to herein as the quanta exposure (H), the threshold may be selected such that the probability of the signal being less than the threshold is equal (or substantially equal) to the probability of the signal being greater than or equal to the threshold, thus providing for high quality binary quantum random number generation. As will also be understood in view of the present disclosure, in some embodiments, the threshold may be controlled (e.g., dynamically, based on feedback) to ensure quality randomness in view of, for example, temporal fluctuations in the quanta exposure (e.g., due to varying average emission intensity of the photon source). Alternatively or additionally, the quanta exposure may be controlled to ensure quality randomness (e.g., by controlling the photon source emission rate and/or the pixel integration time).

In addition, in some embodiments the random data generated from the QIS output may be input to and processed by a randomness extractor to provide random number data having further improved randomness qualities. The randomness quality of the random data output by the QIS may require greatly reduced post-processing (e.g., randomness extraction processing) compared to, for example, prior SPAD and CIS based RNGs. And, some embodiments may provide high quality quantum random number generation without requiring a randomness extractor.

Figure 1:
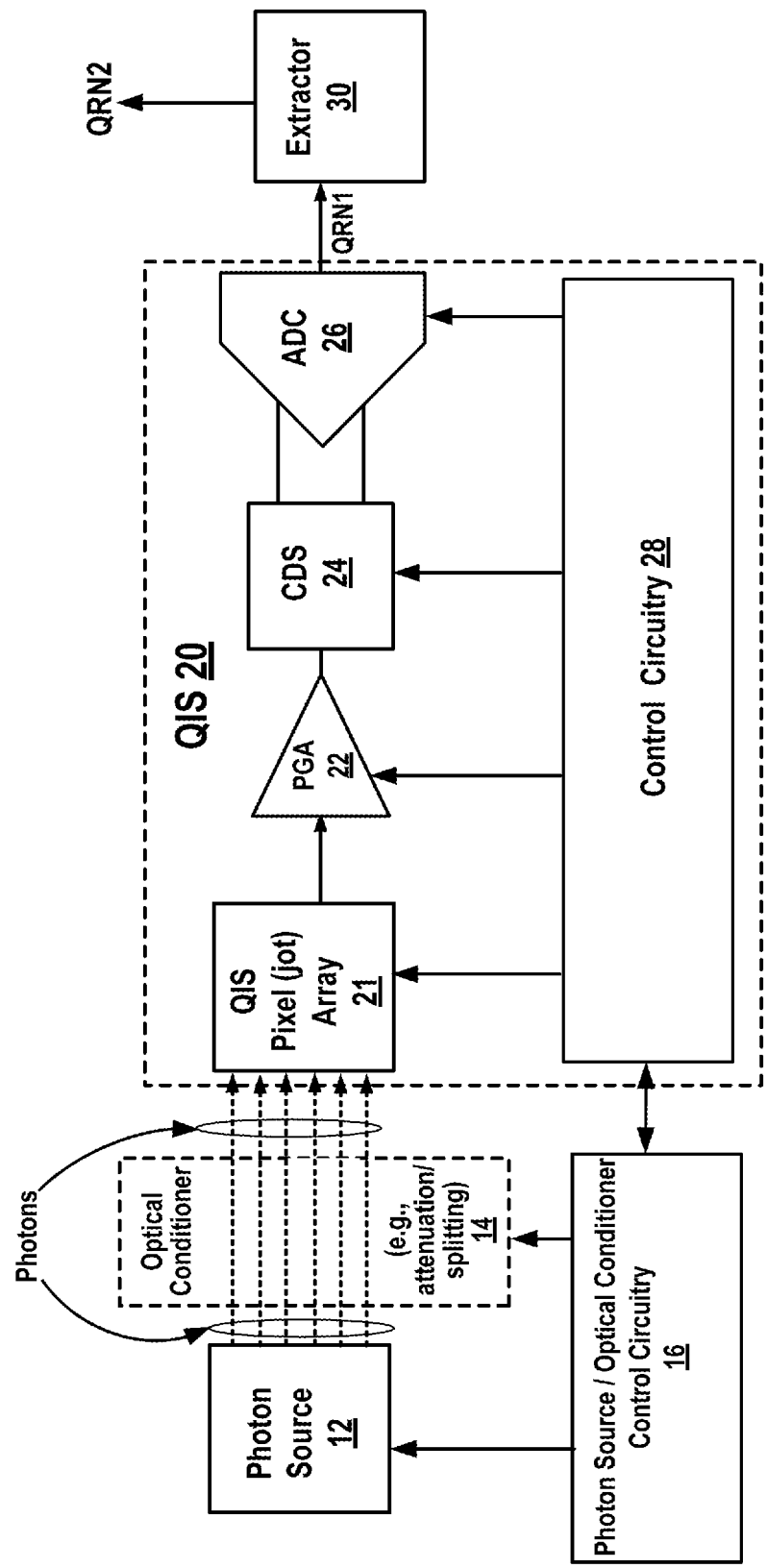
FIG. 1 schematically depicts a high-level block diagram of an illustrative Quanta Image Sensor (QIS) Quantum Random Number Generator (QRNG), in accordance with some embodiments according to the present disclosure.

Referring now to FIG. 1, depicted is a schematic, high-level block diagram of an illustrative QIS QRNG, in accordance with some embodiments according to the present disclosure. As shown, the illustrative QIS QRNG embodiment comprises a photon source 12 and an optical conditioner 14 under control of control circuitry 16, a Quanta Image Sensor (QIS) 20, and a randomness extractor 30. Photon source 12, conditioner 14, and QIS 20 are configured (e.g., according to position/alignment, and/or use of reflection, optical waveguiding (e.g., using an optical fiber or other waveguide structure), and/or other optical components) such that photons emitted by source 12 impinge via optical conditioner 14 on a QIS pixel array 21 of QIS 20. In various embodiments, QIS QRNG may be implemented monolithically (e.g., formed on a common semiconductor substrate), or as two or more separate chips (e.g., die) or other components. For instance, in some embodiments, photon source 12 may be formed on a first die, QIS 20 may be formed as a backside-illuminated imager on a second die, and extractor 30 (and possibly additional processing and/or buffering circuitry) may be formed on a third die, with the first, second, and third dies vertically stacked (in sandwich-like fashion) and integrated.

Photon source 12 may be implemented as any of various optical sources that emits photons according to Poisson statistics, such as one or more light emitting diodes (LEDs; e.g., an silicon (Si) LED device or Si LED array), or one or more laser diodes (e.g., driven with above-threshold drive current). In such embodiments, for example, the intensity of the photon signal emitted by photon source 12 may be controlled by circuitry 16 according to the LED or laser drive current. Alternatively or additionally, the photocarrier (e.g., photoelectron) rate generated in the QIS may be adjusted based on the relative location of the photon source to the pixel array, and in some embodiment this relative location is configured to be controllable/adjustable (e.g., manually and/or automatically (e.g., without user input)). In some embodiments, however, the photon source 12 (and any photon source control circuitry) may be independent of the QIS QRNG apparatus; for example, in some such embodiments photon source 12 may be an independent photon source, such as a source of ambient light that may be detected by QIS 20. In other words, in such embodiments, the photon source may not be considered as being part of the QIS QRNG apparatus, although QIS QRNG embodiments according to the present disclosure may be configured to include photon source 12 as well as its drive/power and/or control circuitry.

Optical conditioner 14, which is an optional component, may be included to provide additional control over the photon signal that impinges on the QIS array 21. For example, optical conditioner may be a controllable attenuator, splitter, or the like.

QIS 20 is schematically depicted as comprising a pixel (e.g., jot) array 21, a readout chain comprising a programmable gain amplifier (PGA) 22, correlated-double-sampling (CDS) circuitry 24, and analog-to-digital converter (ADC) 26, all under control of control circuitry 28, which may also be coupled with control circuitry 16 for purposes of coordinated control of photon source 12, optical conditioner 14, and QIS 20 in providing a quality quantum random number data signal QRN1 output from QIS 20 (e.g., by controlling H and/or Ut, as will be further understood below). It will be understood that the simplified block diagram of QIS 20 is set forth for clarity of exposition in describing the operation of the QIS QRNG with respect to readout of an individual pixel (jot) within the QIS pixel array 21, which may comprise around a billion or more (e.g., several billion) sub-diffraction limit pixels that may be read out row-wise in column-parallel manner, with each column of pixels being associated with a readout chain comprising PGA, CDS, and ADC circuitry (though, e.g., in some embodiments all columns may not be read out in parallel simultaneously as groups of two or more columns may share readout chain circuitry (e.g., such as sharing at least an ADC)). In addition, for example, QIS 20 may comprise additional circuitry, such as an output buffer and/or image/data processing circuitry coupled between the output of ADC 26 and input to extractor 30 (e.g., by way of non-limiting example, data QRN1 may be input to a buffer that is accessible to image/data processing circuitry that is configured to process QRN1 data and write the processed data back to the buffer for output to extractor 30).

Depending on the implementation, QIS 20 may be a single-bit QIS or multi-bit QIS. Each pixel/jot of QIS 20 has single-electron sensitivity (e.g., ~0.15e– r.m.s.) which may be obtained from high, in-pixel conversion gain, e.g., more than 500 µV/e–, and more than 10000 µV/e– in some embodiments. As described, QIS 20 may comprise at least one billion jots (at least 1 G-jot, such as several G-jots), though some embodiments may employ less than 1 G-jot (e.g., ~0.1 G-jots or more). And the readout speed may be more than 1000 fps, which yields an output data rate of (e.g., for a single-bit QIS) about 100 Gb/s to more than 1 Tb/s (e.g., several Tb/s). Depending on the application, the output data rate may be varied according to the number of jots in the QIS array and/or the readout scan rate may be varied.

The QIS jots may be implemented as pump-gate jots; however, any suitable jot device for implementing a single-bit or multi-bit QIS (e.g., having sufficient conversion gain for single photocarrier detection) may be employed. Additional aspects and details concerning implementations of a QIS in a QIS QRNG in accordance with embodiments of the present disclosure may be understood by those skilled in the art in view of, for example, each of the following publications, each of which is hereby incorporated by reference herein in its entirety: (i) PCT international application publication no. WO/2015/153806 (corresponding to PCT international application no. PCT/US2015/023945), "CMOS Image Sensor with Pump Gate and Extremely High Conversion Gain," published Oct. 8, 2015, (ii) J. Ma and E. R. Fossum, A Pump-Gate Jot Device with High Conversion Gain for Quanta Image Sensors, IEEE J. Electron Devices Society, vol. 3(2), pp. 73-77, March 2015, (iii) J. Ma and E. R. Fossum, Quanta image sensor jot with sub 0.3 e– r.m.s. read noise and photon counting capability, IEEE Electron Device Letters, vol. 36(9), pp. 926-928, September 2015, (iv) J. Ma, D. Starkey, A. Rao, K. Odame, and E. R. Fossum, Characterization of quanta image sensor pump-gate jots with deep sub-electron read noise, IEEE J. Electron Devices Society, vol. 3(6), pp. 472-480, November 2015, and (v) S. Masoodian, A. Rao, J. Ma, K. Odame and E. R. Fossum, A 2.5 pJ/b binary image sensor as a pathfinder for quanta image sensors, IEEE Trans. Electron Devices, vol. 63(1), pp. 100-105, January 2016.

As will be understood, readout of the jots in the QIS array 21 is analogous to readout of accumulated charge from pixels in conventional CISs. During readout, the jot output signal (e.g., output from an in-jot source-follower amplifier, not shown) corresponding to the charge accumulated in the jot may be coupled to a column bus (e.g., corresponding to the input to PGA 22), resulting in a corresponding analog signal being coupled to the input of ADC 26 via PGA 22 and CDS 24 circuitry. ADC 26 converts the input analog signal into an n-bit digital signal.

In a single-bit QIS, the bit width (n) is one (1), and the binary output of the ADC corresponds to whether or not the analog signal input to the ADC 26 from CDS 24 (the "ADC signal input") is less than Ut or not less than Ut. As described above, and as may be further understood in view of the ensuing disclosure (as well as the Appendix of priority U.S. Provisional Application No. 62/332,077, filed May 5, 2017, which is hereby incorporated herein by reference in its entirety), Ut may be selected such that these cases are equiprobable, thus providing for the binary output (e.g., QRN1) having high quality randomness (e.g., with bit entropy ~1) based on the quantum optical randomness of the photon source.

In some multi-bit QIS embodiments, the bit width (n) may be an integer value between, for example, two and about 6 (e.g., $1 \leq n \leq 6$). In some such embodiments, the LSB may correspond to one photoelectron. It will be understood, however, that in various alternative embodiments, it is also possible to configure the ADC such that the LSB is less than the equivalent of one photoelectron (e.g., 0.2 electrons). Some multi-bit QIS embodiments may employ more than 6 bits, and the DN output by the ADC may be linearly scaled over the range of the analog signal range input to the ADC based on the number of photoelectrons that can be detected/counted by the jot, the readout noise, and the gain (e.g., jot conversion gain, PGA gain).

In some embodiments, control circuitry 28 may provide threshold Ut as an analog signal to ADC 26 (e.g., control circuitry 28 may convert a digital Ut signal to the analog Ut signal; or Ut may originate as an analog signal in control circuitry 28), which may compare the threshold Ut in the analog domain to the analog signal input to the ADC 26 from CDS 24 (the "ADC signal input"), and output a binary value (e.g., "0" or "1") according to whether the ADC signal input is less than Ut or not less than Ut. Similarly, such analog domain comparison may be implemented wherein control circuitry 28 provides a digital Ut value to ADC 24, which may comprise digital-to-analog converter (DAC) circuitry to convert Ut to an analog signal.

In some embodiments, the comparison with Ut may be executed in the digital domain. For example, ADC 26 may convert the ADC signal input into an multi-bit digital number (DN). That multi-bit digital number may be compared with a digital representation of Ut (e.g., which may be generated from an analog Ut signal, or may originate as a digital value), and a binary value may be generated based on whether the DN is less than or not less than Ut. It will be understood that such digital comparison may be implemented within the QIS (e.g., in circuitry following the ADC output (not shown); or, in some implementations, such circuitry may also be embodied in (or considered as being logically part of) ADC 26). Alternatively, for example, such digital comparison circuitry may be implemented external to (e.g., off-chip) from the QIS, and may be embodied within the extractor 30 in some embodiments.

Accordingly, in some multi-bit QIS embodiments, the output of the ADC may be a multi-bit digital number (DN) (e.g., representing the ADC input signal) that may be provided to additional circuitry to generate a single-bit random number bit stream based on comparison with a threshold value. And, in some multi-bit QIS embodiments, the output of the ADC may be a single-bit random number bit stream (e.g., where the ADC incorporates digital-domain comparison circuitry).

As noted, in some embodiments, such post-ADC digital-domain comparison circuitry may be embodied in randomness extractor 30, which may further process the random number bit stream to provide a random number bitstream QRN2 having improved randomness using techniques known to those skilled in the art (e.g., compression algorithms based on hashing and/or matrix multiplication). In some embodiments, however, randomness extractor 22 may not be required (and thus may not be included as part of QIS QRNG). For example, QIS QRNG may be configured to periodically or aperiodically adjust/control one or more of, for example, the threshold value (Ut), the jot detection time interval, and the photon source emission intensity to maximize the randomness (e.g., according to the bit entropy metric) of the generated random number data (e.g., QRN1). In some embodiments, such adjustment control may be based on, for example, monitoring the quanta exposure and/or measuring/monitoring the randomness of the generated random number data.

Design and operational principles for implementing a QIS QRNG according to some embodiments of the present disclosure may be further understood in view of the following, as well as in view of the Appendix of priority U.S. Provisional Application No. 62/332,077, filed May 5, 2017, which is hereby incorporated herein by reference in its entirety.

Figure 2:
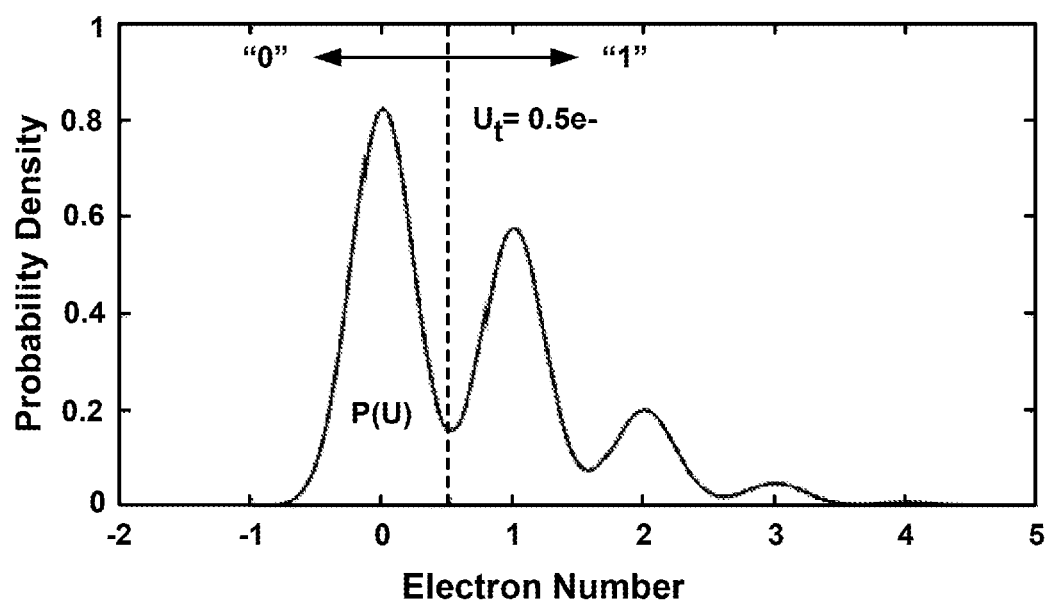
FIG. 2 depicts an illustrative example of an output signal distribution and binary data conversion in connection with implementing a QIS QRNG, in accordance with some embodiments according to the present disclosure.

In a QIS (as in a conventional CIS), the photon signal is converted to a voltage signal in one pixel/jot and corrupted with noise in the readout chain. The distribution of the output signal is a convolution between the Poisson distribution of the arrival of photoelectrons and a normal distribution of noise. An example of signal distribution is shown in FIG. 2. The average rate of photoelectrons is defined as quanta exposure H. In a single-bit QIS, an artificial threshold $U_t$ (e.g., 0.5e–) is set in the readout chain to convert the output signal to binary data: output signal higher than $U_t$ will be converted into "1" and to "0" when it is below $U_t$. The probability of "1" state is:

$$P[U < U_t] = \sum_{k=0}^{\infty} \frac{1}{2}\left[1 + \text{erf}\left(\frac{U_t - k}{u_n\sqrt{2}}\right)\right] \cdot \frac{e^{-H}H^k}{k!}$$

where $u_n$ is the read noise of the sensor, and the probability of "0" state is:

$$P[U \geq U_t] = 1 - P[U < U_t]$$

Given a proper quanta exposure H (e.g. H<1), a 1-bit random number can be generated from one readout of one jot. The QIS based random number generator can include a QIS device and a stable light source (e.g., such as described hereinabove in connection with embodiments according to FIG. 1 and some variations thereof). An ideal random number generator is expected to generate "0s" and "1s" with equal probability; otherwise, an extractor may need to be applied to select the useful data. The minimum entropy indicates the percentage of useful data, which is given by:

$$S_{min} = -\log_2[\max(P[U \geq U_t], P[U < U_t])]$$

An entropy close to 1 is ultimately desired. To achieve that, a quanta exposure $H = \log_e(2)$ may be set up by the illumination condition (e.g., light source, packaging, QIS integration time).

As noted above, further description of a QIS QRNG, including its principles of operation, according to some embodiments of the present disclosure is presented in the Appendix of priority U.S. Provisional Application No. 62/332,077, filed May 5, 2017, which is hereby incorporated herein by reference in its entirety, which Appendix is set forth as an article entitled "Quantum Random Number Generation Using Quanta Image Sensor," which illustrates some embodiments of the present invention as well as various features and advantages that may be associated with some embodiments, and is not intended to limit the present invention.

In view of the present disclosure, it will be understood that a QIS QRNG provides many features and advantages that, among other things, overcome limitations of known SPAD and conventional CIS based RNGs. For example, as discussed, a QIS may include, for example, 100 Mjots to one or more Giga-jots having photon-counting capability, with the jot array having submicron pitch (e.g., 200 nm-500 nm), and the QIS can be readout at a high frame rate (1000 fps). Accordingly, these features (e.g., small jot size and high speed) provide the QIS QRNG with extremely high data output rate. And the photon-counting capability of jot device can ensure the QRNG is fully photon quantum effects based. Further, the low dark current (e.g., 0.1 e−/sec at room temperature) provides for improved randomness quality and stability. In short, some embodiments of a QIS-based QRNG device provides for, among other things, high data rate (e.g., 5-12 Gb/s), low dark current error, and high stability.

Accordingly, although the above description of illustrative embodiments of the present invention, as well as various illustrative modifications and features thereof, provides many specificities, these enabling details should not be construed as limiting the scope of the invention, and it will be readily understood by those persons skilled in the art that the present invention is susceptible to many modifications, adaptations, variations, omissions, additions, and equivalent implementations without departing from this scope and without diminishing its attendant advantages. For instance, except to the extent necessary or inherent in the processes themselves, no particular order to steps or stages of methods or processes described in this disclosure, including the figures, is implied. In many cases the order of process steps may be varied, and various illustrative steps may be combined, altered, or omitted, without changing the purpose, effect or import of the methods described. Similarly, the structure and/or function of a component may be combined into a single component or divided among two or more components. It is further noted that the terms and expressions have been used as terms of description and not terms of limitation. There is no intention to use the terms or expressions to exclude any equivalents of features shown and described or portions thereof. Additionally, the present invention may be practiced without necessarily providing one or more of the advantages described herein or otherwise understood in view of the disclosure and/or that may be realized in some embodiments thereof. It is therefore intended that the present invention is not limited to the disclosed embodiments but should be defined in accordance with claims that are based on the present disclosure, as such claims may be presented herein and/or in any patent applications claiming priority to, based on, and/or corresponding to the present disclosure.

What is claimed is:

1. A quantum random number generator (QRNG), comprising:
   a Quanta Image Sensor (QIS) comprising a pixel array, wherein each pixel of the QIS is configured to convert photons emitted from a photon source into photocarriers having electrical charge, wherein the QIS is configured to readout each pixel to provide a signal representing a number of the photocarriers collected within a time interval with single-photocarrier sensitivity; and
   wherein the QRNG is configured to output random number data having randomness based on the number of collected photocarriers within the time interval, wherein for each pixel the number of photocarriers collected within the time interval is converted to a voltage and then into a binary signal using a threshold level that can be adjusted by adjusting a reference voltage.

2. The QRNG according to claim 1, wherein the voltage is compared to the threshold level in the analog domain.

3. The QRNG according to claim 1, wherein the conversion is performed in the digital domain, wherein the voltage is converted to a digital signal or digital number (DN) by an analog-to-digital converter (ADC) which has a bit depth higher than 1-bit, and the digital signal or digital number is converted to a 1-bit random number.

4. The QRNG according to claim 1, wherein a rate of collection of the photocarriers and the threshold level are tunable to realize a randomness entropy of the random number data that is ideal and/or to realize greater than a minimum value of the randomness entropy of the random number data.

5. The QRNG according to claim 1, wherein a rate of collection of the photocarriers is capable of being adjusted based on the relative location of the photon source to the pixel array.

6. The QRNG according to claim 1, wherein the reference voltage is supplied by an on-chip or off-chip digital-to-analog converter (DAC).

7. The QRNG according to claim 1, wherein at least the threshold level is periodically or aperiodically reset to maximize randomness entropy.

8. The QRNG according to claim 1, wherein one or more of the following are periodically or aperiodically adjusted to maximize randomness entropy of the random number data:

the time interval over which the photocarriers are collected, an intensity of the photon source, and the threshold level used to determine the value of the binary signal.

9. The QRNG according to claim 1, wherein the QRNG includes the photon source.

10. The QRNG according to claim 1, wherein the QRNG includes a randomness extractor.

11. The QRNG according to claim 1, wherein the QRNG includes an optical conditioner disposed such that photons emitted by the photon source impinge on the optical conditioner prior to impinging on the pixel array.

12. The QRNG according to claim 1, wherein the photon source has an intensity that is tunable to realize an ideal randomness entropy of the random number data and/or to realize greater than a minimum value of the randomness entropy of the random number data.

13. A QRNG, comprising:
a Quanta Image Sensor (QIS) comprising an array of jots that are each configured to provide single-photon detection of photons emitted from a photon source having Poisson photon-emission statistics, wherein each jot is configured with sufficient in-pixel conversion gain, and without in-pixel avalanche gain, to provide for readout from the jot of an electrical signal representing a number of photons detected by the jot within a time interval, wherein the electrical signal has single-charge sensitivity and resolution corresponding to single-photon sensitivity and resolution; and
wherein the QRNG is configured to output random number data, wherein for each jot the number of photons detected by the jot within the time interval is a quantum random variable used for generation of the random number data.

14. A QRNG comprising:
a QIS that includes an array of pixels, wherein each pixel is configured to convert each of at least one photon incident on the pixel into a respective photocharge-carrier that is stored in the pixel; and wherein the QIS is configured to readout from each pixel, with single-photocharge-carrier sensitivity, each of the at least one respective photocharge-carriers, if any, stored in the pixel within a time interval, so as to generate a pixel signal corresponding to a number of photocharge-carriers stored in the pixel, wherein each pixel has sufficient in-pixel conversion gain, without in-pixel avalanche gain, to provide for readout of the photocharge-carriers with single-charge sensitivity and resolution; and
comparison circuitry configured to compare for each pixel, the pixel signal with a threshold level to generate for each pixel a bit having a binary value that depends on whether or not the pixel signal is less than the threshold level or not less than the threshold level, wherein the binary values are substantially equiprobable based on the threshold level, thereby providing for binary output data having high quality randomness.

15. The QRNG according to claim 14, further comprising one or more of (i) a photon source configured to generate photons incident on the QIS pixel array, (ii) an optical conditioner disposed such that photons emitted by the photon source impinge on the optical conditioner prior to impinging on the pixel array, and (iii) a randomness extractor configured to process data generated from readout of the QIS.

16. The QRNG according to claim 15, wherein the QRNG includes control circuitry configured to adjust or control at least one of (i) the threshold level, (ii) the time interval, (iii) the photon source emission intensity, and (iv) the optical conditioner, to maximize the randomness of the binary output data generated by the QRNG.

17. The QRNG according to claim 14, wherein each pixel has an associated read noise that is at least one of 0.5 charge carriers rms or less, 0.3 charge carriers rms or less, and 0.15 charge carriers rms or less.

18. A method for quantum random number generation, the method comprising:
generating for each of a plurality of pixels of a single-bit or multi-bit Quanta Image Sensor (QIS) a signal representing a number of individual photons incident on the pixel over a time interval, said signal being generated without in-pixel avalanche gain; and
generating random number data based on a plurality of the signals, each of the signals representing the number of photons detected over the time interval for a respective one of the pixels, wherein said number of photons detected over the time interval for each of the pixels varies as a quantum random variable.

19. A QRNG, comprising:
a Quanta Image Sensor (QIS) comprising an array of jots that are each configured to provide single-photon detection of photons emitted from a photon source having Poisson photon-emission statistics, wherein each jot is configured with sufficient in-pixel conversion gain, and without in-pixel avalanche gain, to provide for readout from the jot of an electrical signal representing a number of photons detected by the jot within a time interval, wherein the electrical signal has single-charge sensitivity and resolution corresponding to single-photon sensitivity and resolution; and
comparison circuitry configured to compare, for each jot, the electrical signal with a threshold level, wherein the QRNG is configured to output random number data, wherein for each jot the number of photons detected by the jot within the time interval is a quantum random variable used for generation of the random number data based on the comparison of the electrical signal with the threshold level.

* * * * *